Nov. 2, 1965  W. L. GRIFFIN  3,214,893
LAWN MOWER CLEANER
Filed April 30, 1963

INVENTOR.
WILLIAM LESLIE GRIFFIN
BY John P. Murphy
ATTORNEY

3,214,893
LAWN MOWER CLEANER
William Leslie Griffin, 1002 Jervis Ave., Rome, N.Y.
Filed Apr. 30, 1963, Ser. No. 276,851
2 Claims. (Cl. 56—25.4)

This application is a continuation-in-part of application Serial Number 107,781, filed May 4, 1961, by William Leslie Griffin and now abandoned.

This invention relates to lawn mowers of the rotary power operated type wherein a rotating blade is utilized for cutting grass and the like, and more particularly to a cleaning device for the casing of such mowers.

Power operated lawn mowers of the type wherein a rotating blade is adapted to cut grass and the like are normally constructed such that the blade is disposed within a casing whereby to protect the operator against injury by the blade. The casing may also include a discharge chute for the clippings. During operation of the conventional mower, clippings are impinged against the inside of the casing and the discharge chute where they adhere and thence accumulate. The accumulation of clippings soon builds up to the point where the mower loses its efficiency and fails to operate properly. The clippings adhere to the casing either because the grass and the like is damp when being cut, or because the water or sap contained by the grass and the like causes the clippings to become sticky following the impact of the rotating blade.

It is annoying and difficult for the operator of the mower to have to clean the mower periodically during the mowing of a lawn, often requiring that the mower be stopped and overturned. Aside from the obvious disadvantage of the dirty and messy job of cleaning a clogged mower casing of clippings and of the need to dispose of the clippings; a careless operator may cause mechanical damage to the mower by tipping it such that the oil in the power source is caused or permitted to flow out of its proper area. Obviously, expensive repairs may be required in this instance.

It has been proposed that a hose be attached to a lawn mower to provide water for cleaning the casing; however, such simple prior art devices have failed to produce the necessary and desired efficient cleaning of a lawn mower.

It is therefore a principal object of this invention to provide means for efficiently and properly cleaning the casing of a power lawn mower.

It is another object to overcome the clogging of the casing and discharge chute of a power lawn mower.

Another object is to provide a cleaning means for lawn mowers which is self operating.

Another object is to provide a cleaning means for lawn mowers which, in part, utilizes the action of the mower itself in accomplishing the above objects.

Other objects and advantages of the invention will become apparent from the following detailed specification, when read with reference to the accompanying drawing.

In carrying out the objects of the invention there is provided a cleaning device for a lawn mower having a rotating blade comprising a plurality of water outlets disposed equidistantly around the casing for the blade, wherein water is discharged into the casing and is dispersed by the blade throughout the casing and through the discharge chute.

Figure 1:
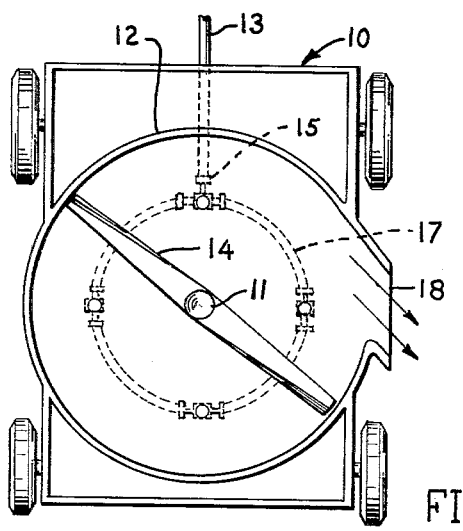
FIG. 1 is a bottom of a typical rotary mower, illustrating the blade, discharge chute, and the invention.
Figure 2:
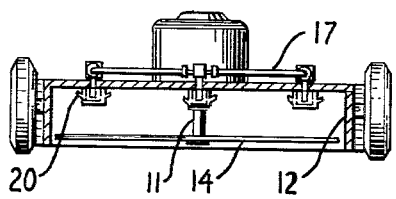
FIG. 2 is a sectional view of a typical mower, illustrating the invention.

Referring to FIGS. 1 and 2; there is illustrated a conventional power lawn mower 10, including a casing 12 which may be mounted on wheels for being moved about. A shaft 11 extends from any power source and has disposed thereon a rotary blade 14. It is understood that all of the above is conventional, and that the blade 14 is usually provided with one or more sharpened edges. Therefore, as the mower is moved about, the blade 14 which is rotating at great speed on the shaft 11, clips the grass or the like and causes the clippings to be discharged normally in the direction of the arrows in the discharge chute 18. However, due either to wet grass, or to the water or sap in the grass, the clippings adhere to the wall of the casing and in the chute 18 and accumulate to the point where the mower becomes clogged and fails to operate properly.

The following elements of this invention, when used in combination with a mower, overcome this condiiton.

Disposed and carried around the casing 12 is a water pipe means 17. A plurality of jet fixtures 16 are disposed equidistantly around the casing 12 and extend therethrough to the underside, as will appear. The fixtures 16 are connected together by the pipe 17. Any suitable hose fitting or connector 15 forms means for connecting a supply of water to the pipe 17. Hose 13 or the like forms a supply of water under pressure.

Figure 3:
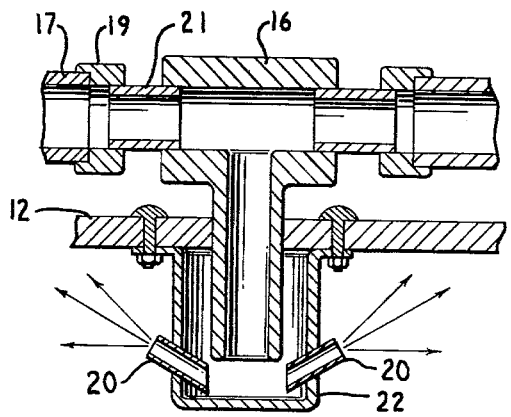
FIG. 3 is an enlarged sectional view of the part of the invention.
Figure 4:
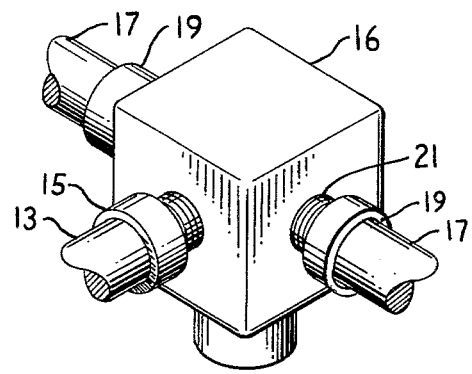
FIG. 4 is an enlarged perspective of part of the invention.

FIGS. 3 and 4 illustrate one embodiment of a suitable fixture and nozzle means therefor. A fixture cap 22 is fastened to the underside of the casing 12. Disposed in the cap 22 are a plurality of nozzles 20, which are arranged radially about the cap 22 and are extended at an upward angle therefrom. The fixture 16 extends down into the cap 22 for supplying water to the nozz'es 20. Suitable pipe nipples 21 or the like may extend from the fixture 16 for supporting fittings 19. The fittings 19 may be compression fittings for the pipe 17, or may be pipe unions or such necessary fittings for effecting a water tight seal between the pipe 17 and the fixture 16.

When it becomes necessary to clean the lawn mower of clippings the supply of water under pressure is connected to the hose fitting 15 by means of hose 13 or the like. With the blade 14 rotating, being driven by shaft 11, water under pressure is admitted into the pipe 17 and is caused to enter the jet fixtures 16 and jet caps 22. The water is discharged through the nozzles 20 in the direction of the arrows in FIG. 3. It is pointed out that the water is directed radially in all directions from the fixtures and upwardly against the casing 12. The entire underside of the casing 12 is thus drenched; and the water falls from the casing into the path of the rotating blade 14. The blade 14 then disperses the water with great force and in fine high velocity droplets against the side of the casing and through the discharge chute 18 to dislodge the clippings and discharge same.

It is also pointed out that the equidistant disposition of the nozzles in the casing assures even distribution of water in the casing and also adjacent to the chute 18 for efficient and complete removal of the clippings. Greater operator safety is afforded during cleaning in that the operator need not reach under the casing in the path of the blade 14. The possibility of mechanical damage due to careless cleaning is eliminated; whereby all objects of the invention are carried out.

It is to be understood that the invention is not to be limited to the embodiment shown and described, but is to be construed as fairly falls within the spirit and scope of the appended claims.

I claim:
1. In a lawn mower having a casing including a discharge chute and a rotating blade disposed within the casing; means for cleaning the underside of the casing comprising a water pipe means carried by the casing around the top thereof, a plurality of jet fixtures connected by said pipe, said fixtures being disposed equidistantly around the casing, a nozzle for each said fixture adapted to discharge water within the casing, and means for admitting water under pressure in said pipe, said nozzles being adapted to discharge the water within the underside of the casing, and said rotating blade being adapted to disperse the water around the casing and through the discharge chute.

2. In a lawn mower having a casing including a discharge chute and a rotating blade disposed within the casing; means for cleaning the underside of the casing comprising a water pipe means carried by the casing around the top thereof, a plurality of jet fixtures connected by said pipe, said fixtures being disposed equidistantly around the casing, each said fixture having a plurality of nozzles extending radially and upwardly therefrom within the casing, and means for admitting water under pressure in said pipe, said nozzles being adapted to discharge the water evenly and in all directions within the underside of the casing, and said rotating blade being adapted to disperse the water around the casing and through the discharge chute.

References Cited by the Examiner
UNITED STATES PATENTS

| | | | |
|---|---|---|---|
| 1,758,767 | 5/30 | Taggert | 239—556 |
| 2,566,324 | 9/51 | Frese | 239—500 |
| 2,984,061 | 5/61 | Stabnau | 56—25.4 |
| 2,992,524 | 7/61 | Stabnau | 56—25.4 |
| 3,040,990 | 6/62 | Gotti | 56—25.4 X |
| 3,108,608 | 10/63 | Mahowald | 56—25.4 X |

ANTONIO F. GUIDA, *Acting Primary Examiner.*

CARL W. ROBINSON, RUSSELL R. KINSEY, T. GRAHAM CRAVER, *Examiners.*